United States Patent
Parsons Freund et al.

(10) Patent No.: US 12,556,396 B2
(45) Date of Patent: Feb. 17, 2026

(54) OPT-OUT SYSTEMS AND METHODS FOR TAILORED ADVERTISING

(71) Applicant: NAI, Inc., Washington, DC (US)

(72) Inventors: Leigh Morrow Parsons Freund, Great Falls, VA (US); Antoni Matyjaszewski, Cumberland, ME (US); Julie Karasik, San Francisco, CA (US); Justin Davis, Falmouth, ME (US); Kevin Ferguson, Portland, ME (US)

( * ) Notice: Subject to any disclaimer, the term of this patent is extended or adjusted under 35 U.S.C. 154(b) by 98 days.

(21) Appl. No.: 17/553,515

(22) Filed: Dec. 16, 2021

(65) Prior Publication Data

US 2023/0198769 A1    Jun. 22, 2023

(51) Int. Cl.
*H04L 9/32* (2006.01)
*G06Q 30/0251* (2023.01)

(52) U.S. Cl.
CPC ....... *H04L 9/3236* (2013.01); *G06Q 30/0251* (2013.01)

(58) Field of Classification Search
CPC .......... G06Q 30/0251; H04L 9/3236
USPC ...... 713/168, 156; 705/14.66, 14.58, 43, 65; 709/206, 219; 726/4
See application file for complete search history.

(56) References Cited

U.S. PATENT DOCUMENTS

| | | | | |
|---|---|---|---|---|
| 9,773,257 | B1 * | 9/2017 | Bodell | G06Q 30/0251 |
| 2001/0011349 | A1 * | 8/2001 | Garrison | H04L 63/0478 709/219 |
| 2002/0002674 | A1 * | 1/2002 | Grimes | H04L 63/0876 713/156 |
| 2002/0099663 | A1 * | 7/2002 | Yoshino | G06Q 30/06 705/65 |
| 2002/0186769 | A1 * | 12/2002 | O'Brien | H04N 19/40 348/E5.111 |
| 2003/0037070 | A1 * | 2/2003 | Marston | H04N 7/17318 |
| 2003/0154164 | A1 * | 8/2003 | Mascavage, III | G06Q 20/10 705/40 |
| 2003/0174816 | A1 * | 9/2003 | Green | H04M 3/53325 379/88.17 |
| 2003/0212818 | A1 * | 11/2003 | Klein | H04L 69/329 709/219 |
| 2004/0028025 | A1 * | 2/2004 | Chang | H04L 65/4046 379/900 |
| 2004/0254859 | A1 * | 12/2004 | Aslanian, Jr. | G06Q 10/107 705/26.5 |

(Continued)

OTHER PUBLICATIONS

Criteo, Disable Criteo services on Internet browsers, 2021 (Year: 2021).*

*Primary Examiner* — Tarek Elchanti
(74) *Attorney, Agent, or Firm* — Lexigent LLC

(57) ABSTRACT

Opt-out systems and methods for tailored advertising are disclosed herein. An example method includes registering an endpoint with a service provider hosting an opt-out service that allows users to opt-out of tailored advertising from the endpoint, receiving a first request from a user including an email address, generating a hashed representation of the email address according to a hashing algorithm selected for the endpoint, transmitting a second request to the endpoint, the second request including the hashed representation of the email address, and receiving an acknowledgment that the endpoint has processed the second request. When the second request is processed the user does not receive the tailored advertising from the endpoint.

6 Claims, 15 Drawing Sheets

(56) References Cited

U.S. PATENT DOCUMENTS

| | | | | |
|---|---|---|---|---|
| 2004/0261020 | A1* | 12/2004 | Layman | G06F 9/4493 |
| | | | | 715/234 |
| 2005/0005164 | A1* | 1/2005 | Syiek | H04L 51/48 |
| | | | | 726/4 |
| 2005/0198177 | A1* | 9/2005 | Black | G06Q 30/0248 |
| | | | | 705/14.47 |
| 2005/0273716 | A1* | 12/2005 | Pahno | G06F 16/248 |
| | | | | 715/733 |
| 2006/0031358 | A1* | 2/2006 | Canis | H04L 67/61 |
| | | | | 709/206 |
| 2006/0174106 | A1* | 8/2006 | Bell | H04L 9/3271 |
| | | | | 713/156 |
| 2007/0154016 | A1* | 7/2007 | Nakhjiri | H04W 12/0431 |
| | | | | 380/270 |
| 2007/0192121 | A1* | 8/2007 | Routson | G06Q 50/265 |
| | | | | 705/325 |
| 2008/0294956 | A1* | 11/2008 | Chester | H04L 9/12 |
| | | | | 714/746 |
| 2009/0012844 | A1* | 1/2009 | Ohlsen | G06Q 40/12 |
| | | | | 705/7.29 |
| 2009/0012895 | A1* | 1/2009 | Mehrabi | G06Q 10/10 |
| | | | | 705/1.1 |
| 2009/0052664 | A1* | 2/2009 | Goodman | G11B 20/00666 |
| | | | | 713/193 |
| 2010/0005317 | A1* | 1/2010 | Pribadi | G06F 21/79 |
| | | | | 713/193 |
| 2010/0257578 | A1* | 10/2010 | Shukla | G06F 21/6218 |
| | | | | 726/1 |
| 2011/0047594 | A1* | 2/2011 | Mahaffey | G06F 21/564 |
| | | | | 726/1 |
| 2011/0208589 | A1* | 8/2011 | Garg | H04M 3/4878 |
| | | | | 705/14.58 |
| 2012/0079005 | A1* | 3/2012 | Dent | H04L 51/08 |
| | | | | 709/201 |
| 2014/0156768 | A1* | 6/2014 | Arjunan | H04W 76/40 |
| | | | | 709/206 |
| 2014/0358660 | A1* | 12/2014 | Poole | G06Q 30/0224 |
| | | | | 705/14.25 |
| 2014/0358777 | A1* | 12/2014 | Gueh | G06Q 20/1085 |
| | | | | 705/43 |
| 2015/0149339 | A1* | 5/2015 | Bartmann | G06Q 40/00 |
| | | | | 705/35 |
| 2015/0324577 | A1* | 11/2015 | Singh | G06F 21/6236 |
| | | | | 726/6 |
| 2016/0048879 | A1* | 2/2016 | Huseyn | G06Q 30/0269 |
| | | | | 705/14.66 |
| 2018/0032491 | A1* | 2/2018 | Heo | G06F 40/58 |
| 2020/0020196 | A1* | 1/2020 | Petersen | G07F 17/3218 |
| 2020/0067701 | A1* | 2/2020 | Abadir | G06K 7/1417 |
| 2020/0253790 | A1* | 8/2020 | Regenie | A61F 13/42 |
| 2020/0259836 | A1* | 8/2020 | Kumar | G06F 21/6209 |
| 2020/0351240 | A1* | 11/2020 | Gould | H04L 9/3247 |
| 2020/0357080 | A1* | 11/2020 | Bogaard | G06Q 20/40145 |
| 2022/0353092 | A1* | 11/2022 | Rivera | H04L 9/3268 |
| 2023/0198769 | A1* | 6/2023 | Parsons Freund | H04L 9/40 |
| | | | | 713/168 |

* cited by examiner

| Company Information | Account Information | Endpoints | AMA Endpoints | | ← Back |

Portland Webworks

Website URL ⟋302

`http://www.portlandwebworks.com`

310

Do you collect data across mobile applications?
○ Yes ● No

Opt-Out Cookie Value: ⟋312

Privacy Policy URL ⟋304

`http://www.portlandwebworks.com`

Technologies used for Interest-Based Advertising:
☑ Cookie Technology
☐ Non-Cookie Technologies

[Request to Push Changes Live]

✎ Edit

Company Description ⟋306

Portland Webworks Test Endpoints with Stat IDs

Ad ID Rotation URL ⟋308

`http://bluecava.com/opt-out/`

ADD ENDPOINT                                                  ✕

This form is provided to add your opt-out endpoint. Each endpoint added must comply with the applicable technical specification. Additionally, your use of the opt-out tool shall company with the NAI Codes, Guidance and FAQ's.

By selecting "Add Endpoint," you acknowledge and agree that 1) the NAI opt-out tool is provided solely for the convenience of NAI members and the public, 2) is provided "AS IS," and 3) you are solely responsible for any failure or misuse of the opt-out tool and will indemnify and hold NAI harmless for any such failure or misuse. You further agree that NAI may, without limiting other remedies, terminate your endpoint for any behavior the NAI deems, in its sole discretion, to be either inappropriate, likely to bring disrepute to the NAI or in violation of the NAI's Codes, principles or issued guidance.

Endpoint Title                402
[ Email Opt-Out Endpoint 1 ]

Endpoint URL                  404
[ https://mycompany.com/optout/email ]

Transform email               406
[ Lowercase                                  ⇕ ]

Hash to use on email          408
[ MD5                                        ⇕ ]

API token                     410
[ 098f6bcd4621d373cade4e832627b4f6 ]

[⊘ Cancle]  [⤓ Add Endpoint]

| | NAI CONSUMER OPT OUT | |
|---|---|---|
| Network Advertising Initiative | | ≡ |

It appears that some of the opt-outs did not succeed. Would you like to try again?

| Members | Opt-out status |
|---|---|
| PWW - PII Failing (testpii1) | ✓ Success |
| PWW - PII Failing (testpii2) | ✗ Failed |
| PWW - PII Failing (testpii3) | ✓ Success |

FIG. 5

Keys (NAI Opt-Out Tool-Side)

The following is an example of generating the keypair using OpenSSL.

```
$ openssl ecparam -name prime256v1 -genkey -noout -out key.pem
-----BEGIN EC PRIVATE KEY-----
MHcCAQEEILtpUiRK/
DR7jfweSdaSz7uAcPuaGkNw74t0jxjOjODDoAoGCCqGSM49
AwEHoUQDQgAE0TyXh7VV6U+JVBAJMNPA9Q43piG3vN0bytn1pkh8
6/ci8HvW3fVw tuPxnslj3QBcG+We9mviL/3FFoksDGNhEQ==
-----END EC PRIVATE KEY-----

$ openssl ec -in key.pem -pubout -out opt_out_cert.1.txt
-----BEGIN PUBLIC KEY-----
MFkwEwYHKoZIzj0CAQYIKoZIzj0DAQcDQgAE0TyXh7VV6U+JVBAJMNPA9Q43piG3
vN0bytn1pkh86/ci8HvW3fVwtuPxnslj3QBcG+We9mviL/3FFoksDGNhEQ==
-----END PUBLIC KEY-----
```

FIG. 8

AMA Opt-Out Request Data (NAI Opt-Out Tool-Side)

The following is an example of the data required to generate an AMA opt-out request:

```
const optOut =
    "email":
    "info@networkadvertising.org",
    "token":
    "D7A8FBB307D7809469CA9ABCB0082
    E4", "ts": 1S6148122S,
    "test": true
```

When sending optOut as the request body, it is serialized with
JSON.stringify(). const body = JSON.stringify(optOut)
// body:
"ts":1S6148122S,"email":"info@networkadvertising.org","token":"D
7A8F BB307D7809469CA9ABCB0082E4","test":true

FIG. 8
(Continued)

Generating a Signature (NAI Opt-Out Tool-Side)

The following is a sample implementation of generating a signature from the serialized opt-out in the previous section.

```
const crypto =
require('crypto') const fs =
require('fs')

const sign = (privateKey, message) =>
const buffer = Buffer.from(message, 'utf8')
const signature = crypto.sign('sha256', buffer,
privateKey) return signature.toString('base64')

const privateKey = fs.readFileSync('key.pem', encoding:
'utf8') const signature = sign(privateKey, body)

// signature (will not be the same even for the same data and key):
MEQCiDvfP9wjgyMvt17i9Sjn4y/ZhuMPv9mncERDrzKBnnexAiAb9bqAplOgQHE7sTXu/
3HrD7NA1OKOKWCW7yQXSzbqzA==
```

The following is an example of the structure of the Signature header. keyid contains the URL of the public key, while signature contains the base64-encoded signature of the request body:
Signature: keyid="KEY URL", signature="SIGNATURE"

FIG. 8
(Continued)

AMA Opt-Out Request (NAI Opt-Out Tool-Side)

The following is a sample HTTP request of an AMA opt-out request that would be sent from the opt-out tool's servers to a member's AMA opt-out endpoint.

```
POST /optout/
email Accept:
application/json
Content-Length:
109
Content-Type: application/
jsonSignature:
keyid="https://optout.networkadvertising.org/keys/opt_out_cert.1.txt"
,signature="MEQCiDvfP9wjgyMvtl7i9Sjn4y/ZhuMPv9mncERDrzKBnnexAiAb9bqAp1
OgQHE7sTXu/3HrD7NAl0KOKWCW7yQXSzbqzA=="
"ts":1S6148122S,"email":"info@networkadvertising.org","token":"D7A8F
BB307D780969CA9ABCB0082E4","test":true
```

**FIG. 8
(Continued)**

Verifying an AMA Opt-Out Request Signature (Member Endpoint-Side)

The following is a sample implementation of verifying the digital signature of an AMA opt-out Request. Assume request is an Express 4.x Request object.

```
const https =
require('https') const crypto
= require('crypto')

const getKeyFromCache = keyid =>
// Get public key by keyid from crawl cache.

const processSignatureHeader = value =>
return value.split(',').reduce((c, v)
=>
    const match = v.match(/\s*(.*?)="(.*?)"\s*/)
    return match ? ...c, [match[1]: match[2] : c
,
)

const verify = (publicKey, signature, message)
=> const messageBuff = Buffer.from(message,
'utf8') const sigBuff = Buffer.from(signature,
'base64')
    return crypto.verify('sha256', messageBuff, publicKey, sigBuff)
```

FIG. 8
(Continued)

```
const signatureHeader = request.get('Signature')
const keyid, signature =
processSignatureHeader(signatureHeader) const publicKey =
getKeyFromCache(keyid)
const isVerified = verify(publicKey, signature, request.body)

// isVerified:
// true if verified, false if not.
```

AMA Opt-Out Response (Member Endpoint-Side)

The following is a sample HTTP response of a successfully received and effectuated opt-out request, sent from an endpoint back to the opt-out tool.

```
HTTP/1.1 202 Accepted
Content-Type: application/json; charset=utf-8 Content-Length: 2
```

**FIG. 8
(Continued)**

OPT-OUT SYSTEMS AND METHODS FOR TAILORED ADVERTISING

CROSS-REFERENCE(S) TO RELATED APPLICATION(S)

N/A.

FIELD OF TECHNOLOGY

The present disclosure pertains to systems and methods where users can opt-out of tailored advertising (TA). An example system can allow merchants/endpoint to register with a service provider hosting an opt-out service, as well as allow a user to opt-out of TA with any or all of the registered merchants.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes registering an endpoint with a service provider hosting an opt-out service that allows users to opt-out of tailored advertising from the endpoint. The method also includes receiving a first request from a user. This step may include receiving an user contact information such as an email address; generating a hashed representation of the user contact information according to a hashing algorithm selected for the endpoint. The method also includes transmitting a second request to the endpoint; the second request may include the hashed representation of the user contact information. The method also includes receiving an acknowledgment that the endpoint has processed the second request, where when the second request is processed the user does not receive the tailored advertising from the endpoint. Other embodiments of this aspect include corresponding computer systems, apparatus, and computer programs recorded on one or more computer storage devices, each configured to perform the actions of the methods.

Implementations may include one or more of the following features. The method where registering the endpoint may include: receiving an endpoint address; and receiving a selection of a hashing algorithm that is used to hash the user contact information. The method may include receiving an authorization token for the endpoint. The method may include: transmitting an encrypted verification link to the user; and verifying the user based on the user activating the encrypted verification link. The method may include: displaying a list of endpoints may include the endpoint on a graphical user interface; and receiving a selection of the endpoint from the user via the graphical user interface. Registering the user with the opt-out service may include receiving an acknowledgment from the endpoint that the second request has been processed. The method may include providing an indication to the user as to whether the second request has been successfully processed or failed. Implementations of the described techniques may include hardware, a method or process, or computer software on a computer-accessible medium.

One general aspect includes a system. The system includes a processor; and a memory for storing instructions, the processor executing the instructions to register an endpoint with a service provider hosting an opt-out service that allows users to opt-out of tailored advertising from the endpoint; receive a first request from a user may include an email address; generate a hashed representation of the email address according to a hashing algorithm selected for the endpoint; transmit a second request to the endpoint, the second request may include the hashed representation of the email address; and receive an acknowledgment that the endpoint has processed the second request, where when the second request is processed the user does not receive the tailored advertising from the endpoint. Other embodiments of this aspect include corresponding computer systems, apparatus, and computer programs recorded on one or more computer storage devices, each configured to perform the actions of the methods.

Implementations may include one or more of the following features. The system where the processor is configured to: receive an endpoint address; and receive a selection of a hashing algorithm that is used to hash the email address. The processor is configured to receive an authorization token for the endpoint. The processor is configured to: transmit an encrypted verification link to the user; and verify the user based on a response from the user. The processor is configured to serialize, encrypt, and embed opt-out preferences of the user in a verification link. The processor is configured to generate a graphical user interface that may include a list of endpoints and a means for receiving a selection of the endpoint from the user. The processor is configured to register the user with the opt-out service by receiving an acknowledgment from the endpoint that the second request has been processed. The processor is configured to provide an indication to the user as to whether the second request has been successfully processed or failed. The second request may include an authorization token for the endpoint and a timestamp when the first request was generated. The processor is configured to: encode the second request with an encryption key; and publish the encryption key for downloading by the endpoint, the endpoint using the encryption key to decrypt the second request. The endpoint places an address of the service provider in a whitelist. Implementations of the described techniques may include hardware, a method or process, or computer software on a computer-accessible medium.

One general aspect includes registering a plurality of merchants with a service provider, each of the plurality of merchants having at least one endpoint, each of the plurality of merchants identifying at least a hashing algorithm. The method also includes providing a list of plurality of merchants that are registered with the service provider, each of the plurality of merchants providing audience matched service advertising. The method also includes receiving an email address from a user. The method also includes generating hashed versions of the email address for the plurality of merchants. The method also includes transmitting the hashed versions of the email address to the plurality of merchants selected by the user; and verifying that each of the plurality of merchants selected by the user have processed the hashed versions of the email address so that the user no longer receives audience matched service advertising from the plurality of merchants selected by the user. Other embodiments of this aspect include corresponding computer systems, apparatus, and computer programs recorded on one or more computer storage devices, each configured to perform the actions of the methods.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2 is a screenshot of an example graphical user interface.

FIG. 3 is a screenshot of another example graphical user interface.

FIG. 4 is a screenshot of yet another example graphical user interface.

FIG. 5 is a screenshot of an example graphical user interface.

FIG. 8 illustrates example code that can be used to implement aspects of the present disclosure.

DETAILED DESCRIPTION

Overview

Merchants may engage in tailored advertising (TA) to provide advertisements to customers. An example TA is audience matched advertising, which is the practice of using data-linked, or previously linked, to Personally-Identified Information (PII) to tailor advertising on one or more unaffiliated web domains or applications, or on devices, based on preferences or interests known or inferred from such data. Examples of PII include, but are not limited to data that can be used to directly contact individual such as email address, phone number, other information to directly identify a user. While examples provided herein may refer to audience matched advertising specifically, the present disclosure is not so limited and can be used for any TA which would be known to one or ordinary skill in the art with the present disclosure before them. The merchant may use user contact information, such as a customer email address in either a plaintext or encoded format to provide TA. Other non-limiting examples of user contact information can include phone number, IP address, street address, a device identifier, or other similar data. For purposes of brevity and clarity of description, examples set forth herein will involve email addresses.

The systems and methods herein provide a centralized location where customers can choose to opt-out of TA by members. Merchants can register their endpoints with a service provider that hosts an opt-out service. Merchants can specify details regarding their endpoints, such as preferred hashing algorithms, authorization tokens, flags, and other preferences. Users can select any or all of the merchants registered with the opt-out service and opt-out of TA by entering their email address or another similar customer identifier. That is, while email addresses have been disclosed as the means by which a customer can be identified, the present disclosure is not limited to only the use of email addresses. However, a hashed version of the customer's email address can be used as the identifier for associating offline and online data related to the customer and their devices, and to recognize the same customer on different websites or applications.

The opt-out service can convert the customer's email into the format preferred by each of the merchants and provide the same to the merchants for processing. The merchants can report back to the opt-out service whether the customer's email has been successfully processed for opt-out such that the customer will no longer receive TA from the merchant.

EXAMPLE EMBODIMENTS

Figure 1:
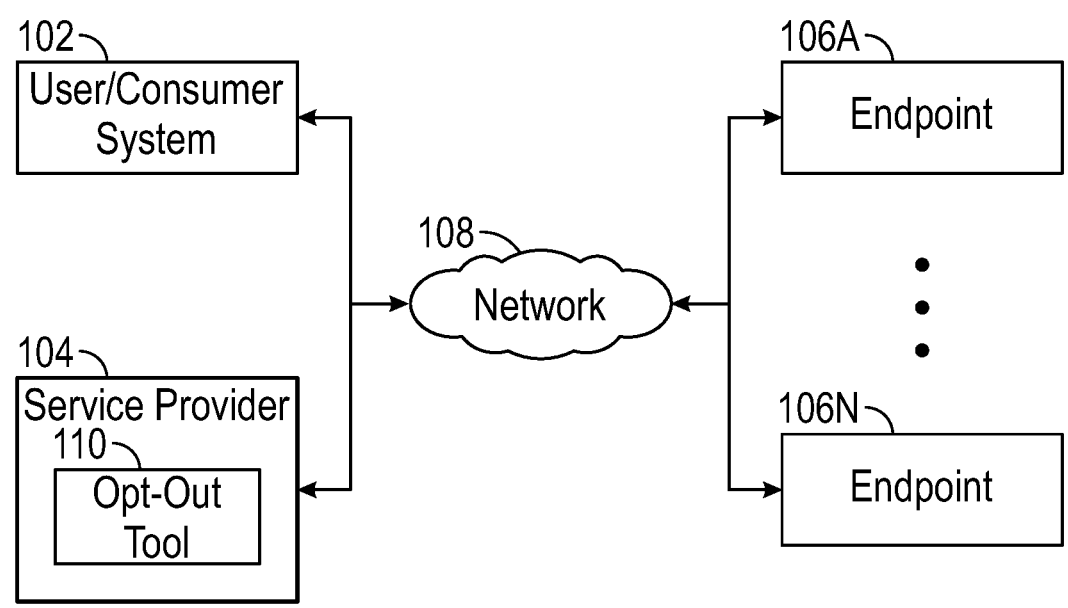
FIG. 1 illustrates an example architecture where the systems and method of the present disclosure may be practiced.

Turning now to the drawings, FIG. 1 depicts an illustrative architecture 100 in which techniques and structures of the present disclosure may be implemented. The architecture 100 includes a user system 102, a service provider 104, a plurality of merchant endpoints 106A-106N, and a network 108. The following description may reference various screenshots of graphical user interfaces generated by the service provider 104. These figures may be referenced collectively with FIG. 1 for context.

Some or all of these components in the architecture 100 can communicate with one another using the network 108. The network 108 can include combinations of networks that enable the components in the architecture 100 to communicate with one another. The network 108 may include any one or a combination of multiple different types of networks, such as cellular, cable, the Internet, wireless networks, and other private and/or public networks. In some instances, the network 108 may include Wi-Fi or Wi-Fi direct.

The user system 102 can comprise any end-user computing device that can access the network 108 to interact with an opt-out tool 110 hosted by the service provider 104. Some descriptions may refer to actions or functions of the opt-out tool 110 and/or the service provider 104 independently, however, it will be understood that actions performed by the service provider implicitly involve the execution and use of the opt-out tool 110. The service provider 104 can include a single or multiple servers (virtual or physical) providing the opt-out tool 110. In some instances, the service provider 104 and opt-out tool 110 can be implemented in a cloud or other similar multi-tenant system.

Each merchant can register to utilize the opt-out tool 110. In some instances, a merchant can register their endpoints with the service provider 104 through the opt-out tool 110. A merchant can register one or more endpoints with the service provider 104. Collectively, merchants that have registered their endpoints are referred to as merchant endpoints 106A-106N.

Figure 2:
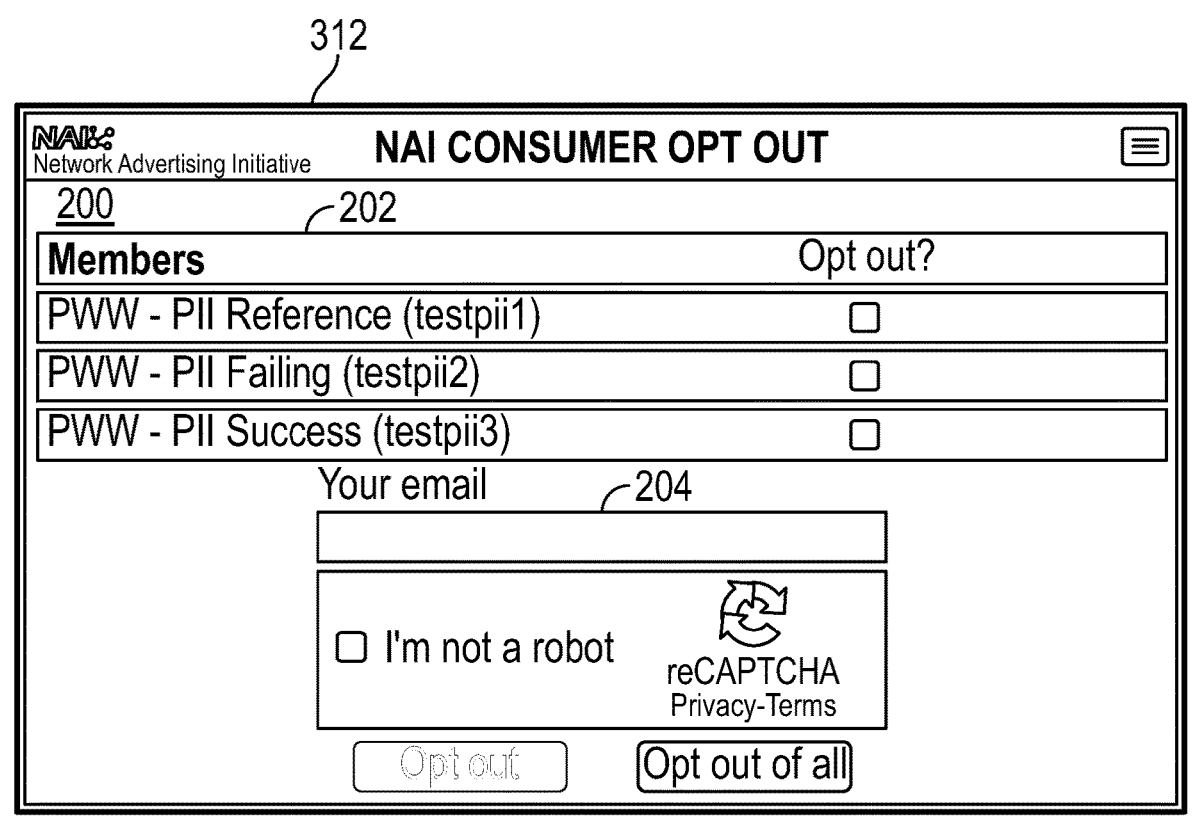

Generally, a customer can utilize the user system 102 to select merchants and supply an email address that can be used to opt-out of TA from the merchants. For example, a customer can be provided with a list of merchants that have registered with the service provider 104 as in FIG. 2. FIG. 2 illustrates an example graphical user interface (GUI 200) that displays a list of merchants 202. The customer can select all or a portion of the merchants in the list. The customer can also enter their email address in an interface 204. These data comprise a first request between the customer and the opt-out tool of the service provider.

Only members with endpoints supporting opt-out requests may be presented to the customer during the opt-out selection process. Members without endpoints supporting opt-out requests may not appear in the selection. When a customer indicates that they would like to opt-out of TA by a merchant integrated with the opt-out tool 110, the opt-out tool 110 may issue an opt-out request (referred to in some instances as a second request) to the published endpoints of that merchant that support opt-out requests.

Referring back to FIG. 1, in response to the service provider receiving the first request, the service provider 104 can transmit a verification link in an email to the customer. In some embodiments, the verification link is encrypted. The customer can click on the verification link to complete the opt-out process, or copy the link manually to a new browser tab/window on the user system 102.

To prevent replay attacks, the service provider 104 can set the verification link to expire after a number of days, for example three days. Additionally, each verification link is one-time use only. Unexpired verification links that have not been navigated may be processed by the opt-out tool 110. If a customer navigates to an expired link or one that has previously been navigated to, the opt-out tool 110 may prompt the customer to restart the opt-out process.

In sum, to verify the authenticity of the customer's email, a verification email can be sent to their specified email address. The verification email may contain a verification link/URL (uniform resource locator). The customer can navigate to the verification link to proceed with issuing opt-out requests. Opt-out requests may only be sent to member endpoints after the customer navigates to the verification URL.

According to some embodiments, customer opt-out preference(s) can be serialized, encrypted, and embedded in the verification link sent in the email verification email. Upon clicking the verification link, the encrypted information is sent back to the opt-out tool 110 for decryption, parsing, and deserialization. This resultant information can be used to make an appropriate opt-out request in real-time in-memory.

The opt-out tool 110 may assign each opt-out link a randomly generated unique ID, which can be embedded in the encrypted verification link, as well as recorded by the opt-out tool 110 servers. This ID may be used to prevent replay attacks. These IDs are not derived from customers' email addresses in some embodiments. After the opt-out verification step, a record of this ID may be removed from the opt-out tool 110 servers. The opt-out tool 110 can also routinely remove records of IDs that are more than a set number of days old, as this is when the URL associated with them may have already expired.

FIG. 3 illustrates an example graphical user interface (GUI 300) where a merchant can register an endpoint. The merchant can input an address 302 of an endpoint. In some instances, the address is a secure HTTP (hypertext transfer protocol) address. The merchant can also enter a privacy policy address 304, as well as a company description 306, and an Ad ID Rotation URL address 308. The member can also indicate whether the merchant collects data across mobile applications 310, as well as an opt-out cookie value 312. The merchant can also indicate whether they implement technology for interest-based advertising.

In FIG. 4, the merchant can provide information related to their endpoint in GUI 400. The GUI 400 allows a merchant to provide an endpoint title 402, an endpoint URL/address 404 of the endpoint, a transformation schema 406 for customer emails (also referred to as a casing), a hashing algorithm 408, and an application programming interface (API) token 410 (also referred to as an authorization token. The hashing algorithm can be selected from any of the following plaintext, MD5, SHA-1, SHA-224, SHA-256, SHA-384, or SHA-512—just to name a few. The transformation schema 406 indicates if the email should be in all lowercase, uppercase, or a combination thereof.

The API token 410 provides a member with additional control and security when receiving opt-out requests, an opt-out request may include a token field that may contain an authorization token. The value for this field can be set by a member when configuring an endpoint in the opt-out tool. If a member chooses not to implement an authentication token in the admin portal, the token field can be omitted from the body of the opt-out request.

When receiving an opt-out request, an endpoint may check the validity of the token. The endpoint may reject the opt-out request if the token was expected but missing, or if the token has its authorization rights to perform an opt-out revoked.

Tokens are essentially disposable passwords of arbitrary arrangements of characters. In the event that the API token is compromised, endpoints must invalidate the token and reject email opt-outs using that token. Compromised tokens must not be reused. A new token can be generated and configured in an administration portal of the opt-out tool for the affected endpoint to continue opt-out functionality.

Correspondingly, to ensure that endpoints only respond to requests from the service provider servers that host the opt-out tool, member endpoints can whitelist IP (Internet Protocol) addresses of service provider servers that host the opt-out tool. An IP whitelist may be provided to members by the service provider. Members can respond with an HTTP 403 to opt-out requests that come from IP addresses not included in the whitelist.

As noted above, the opt-out request, or second request, can be formed using JSON (JavaScript Object Notation), although other protocols for forming the request can be used. The second request can comprise the email address of the customer. As noted above, the opt-out tool 110 can convert this email address into an encoded format specified by the merchant when registering their endpoints. Thus, the opt-out tool 110 can be configured to use any number of hashing algorithms to encode the email address. For example, a first merchant may select SHA-224 and a second merchant may select MD5. When the customer selects both of these merchants, the opt-out tool 110 can encode the email address of the customer using SHA-224 in an opt-out request that is provided to the endpoint(s) of the first merchant. The opt-out tool 110 can encode the email address of the customer using MD5 in a different opt-out request that is provided to the endpoint(s) of the second merchant. Thus, the opt-out tool 110 creates individual opt-out requests for each merchant/endpoint(s) selected by the customer.

As noted throughout, in some instances, the customer can provide a plain text email address which is transmitted to the endpoint to permit alternative hashing algorithms. That is, the merchant may use its own preferred hashing algorithm(s) to hash email addresses. When the merchant registers their endpoint(s) with the opt-out tool 110, the merchant can specify it would prefer to receive customer emails in plain text.

In some instances, a salting value or other bits of entropy can be used in the hashing process. A salting value can be of any arbitrary size and can comprise any type of characters.

In some embodiments, the salt/salting value can be provided by the merchant or may be randomly generated by the opt-out tool 110.

The second request can also include a timestamp in seconds (could be a Unix timestamp) generated by the opt-out tool 110 when the opt-out was requested (e.g., when the customer clicks on the email verification link). That is, the opt-out tool 110 can timestamp the first request when it is received and/or when the email address of the customer is verified. The second request can include, optionally, the authentication token (API token) specified by the merchant. Also, the second request can include a flag, such as a test flag that indicates whether the opt-out request is a test request.

In one example embodiment, the second request can have the Accept: application/JSON and Content-Type: application/json; charset=utf-8 headers. The second request can have the Content-Length header reflecting the length of the payload. The request will contain a Signature header containing the location of the public key (keyid) and the signature (Signature) of the request payload. The second request may be transmitted by the opt-out tool 110 to an endpoint via an HTTPS POST request. Additional details on public keys and signatures are provided in greater detail infra.

To ensure that an opt-out request was not tampered with during transit, the opt-out tool 110 may append a signature to the opt-out request that can be used to verify the integrity of the opt-out request. To verify a signature of an opt-out request, a member endpoint may be provided with a public key by the opt-out tool 110.

The opt-out tool 110 can place the public key in a plaintext file. The opt-out tool 110 may make the public keys accessible via an HTTPS GET request. Since plain HTTP can be intercepted and changed by an attacker, it may not be trusted for the distribution of key files. Responses to requests to access the signature may have a response header of Content-Type: text/plain; charset=utf-8. The response may also have the Content-Length header reflecting the length of the payload.

New public keys may be published by the opt-out tool 110 at regular intervals, such as every 60-90 days. When publishing a new public key, the public key may be published in a new file, with a unique version number incremented from the last version. Older public key files may remain accessible in the same location.

Public key retrieval by members should not block a member's endpoint responding to an opt-out request. Retrieval of the public key by a member should be a separate process from opt-out request processing. Members may implement crawlers to try to locate newer versions of the public key ahead of time. For example, if a first public key such as opt out cert.1.txt is already known by the member, it can then start pinging opt out cert.2.txt for availability.

To reduce the impact on infrastructure, endpoints may cache already-retrieved public keys. Members may also limit the frequency of key retrievals to once a day, for example. A list of URLs may be from the opt-out tool 110 to members to crawl for public keys. Additional domains may be added/removed in the future.

New public keys may be available prior to use (for example at least 36 hours before they go into use for opt-outs). This timing ensures that public keys can be cached by members before they go into effect on opt-out requests. Once a new key is detected in an opt-out request based on the version number increment it is safe to consider the transition to the new key to be complete and older key versions can be considered expired and invalid. The transition from one key to the next may be precise so it may not be necessary to account for two keys being in use simultaneously.

With respect to opt-out request signatures, these signatures may use Elliptic Curve Digital Signature Algorithm (ECDSA) with SHA-256 as the digest algorithm, as described in code examples of FIG. 8. Other suitable encoding algorithms may be used as well. The data used to generate the signature is the data being sent in the JSON body of an opt-out request. The signature can be encoded in Base64 or another similar encoding schema.

The opt-out request may contain a signature header with keyid and signature parameters, separated by a comma. The keyid field may contain a URL of the public key. The signature field may contain the signature generated from the data in the opt-out request JSON body.

For testing purposes, the JSON body of an opt-out requests can comprise a Boolean test field. When this field is set to true, merchants may not effectuate the opt-out request in their systems, but may respond indicating whether they received the opt-out request successfully or not, as discussed in greater detail infra.

In one example process described in greater detail infra, after the opt-out is processed by an endpoint, the results can be displayed to the customer. For merchants that have successfully processed the opt-out request on their endpoints a success status can be shown. Otherwise, for merchants with any endpoints that failed, a failed status may be shown. An example GUI 500 of opt-out status is illustrated in FIG. 5. In the event of any failures, the opt-out tool 110 can prompt the customer to try again. The customer can cause another opt-out request to be issued by the opt-out tool 110. However, this time the opt-out request may only be sent to the members who had endpoints that previously failed. Thus, the opt-out tool 110 may track which endpoints/members have failed or succeeded in processing an opt-out request and selectively resubmit future opt-out requests to only those endpoints/members that were determined to have failed.

The response can comprise a header content-Type: application/json. Responses may not be HTTP redirects (HTTP 3xx). Response HTTP status code may be one of the following: accepted (opt-out request successfully received and queued for processing or processed); unauthorized (Member received TA opt-out request with invalid token or signature.); and/or forbidden (Member received TA opt-out request from server outside of IP whitelist range). Responses to other invalid opt-out requests must be sent with an appropriate HTTP 4xx status code. Member endpoint errors can respond with an appropriate HTTP 5xx status code. The response body for HTTP responses may be an empty JSON object to allow for future extensibility purposes.

Figure 6:
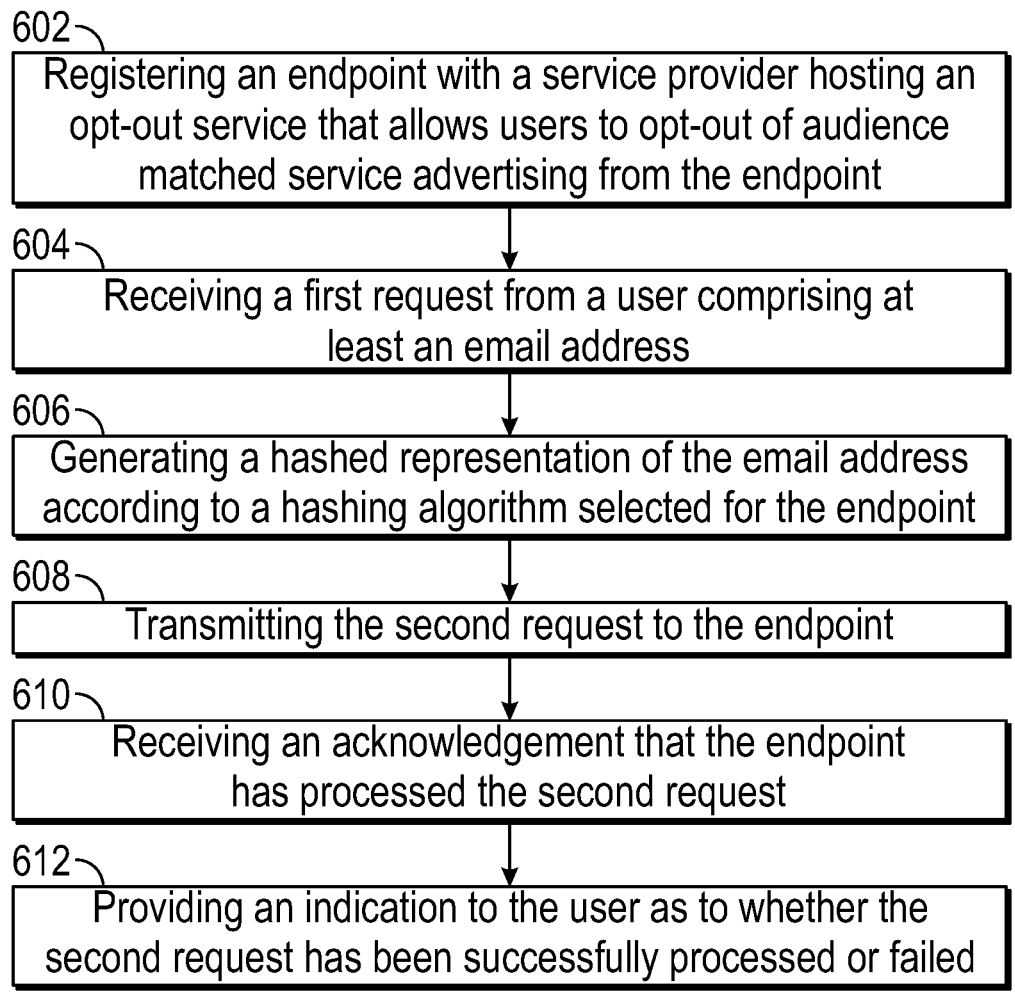
FIG. 6 is a flowchart of an example method of the present disclosure.

FIG. 6 is a flowchart of an example method of the present disclosure. The method can include a step 602 of registering an endpoint with a service provider hosting an opt-out service that allows users to opt-out of tailored advertising from the endpoint. The registration process can involve a merchant entering details for the endpoint such as a URL, hashing algorithm, and security preferences such as an authentication token.

The method can include a step 604 of receiving a first request from a user comprising an email address. The first request can also include a selection of one or more merchants by the user. For example, the method may include displaying a list of endpoints comprising the endpoint on a graphical user interface and receiving a selection of the endpoint from the user via the graphical user interface.

In some embodiments, the method can include a step 606 of generating a hashed representation of the email address according to a hashing algorithm selected for the endpoint. The second request can be constructed as a JSON message as set forth above and can be digitally signed.

The method can include a step 608 of transmitting the second request to the endpoint. Again, the second request comprises at least the hashed representation of the email address. The method can also include a step 610 of receiving an acknowledgement that the endpoint has processed the second request. This acknowledgement can include a success or failure response. It will be understood that when the second request is processed the user does not receive the tailored advertising from the endpoint. In one or more embodiments, the method can include a step 612 of providing an indication to the user as to whether the second request has been successfully processed or failed.

In some embodiments, the method can include transmitting an encrypted verification link to the user and verifying the user based on the user activating the encrypted verification link. It will be understood that registering the user with the opt-out service comprises receiving an acknowledgment from the endpoint that the second request has been processed.

Figure 7:
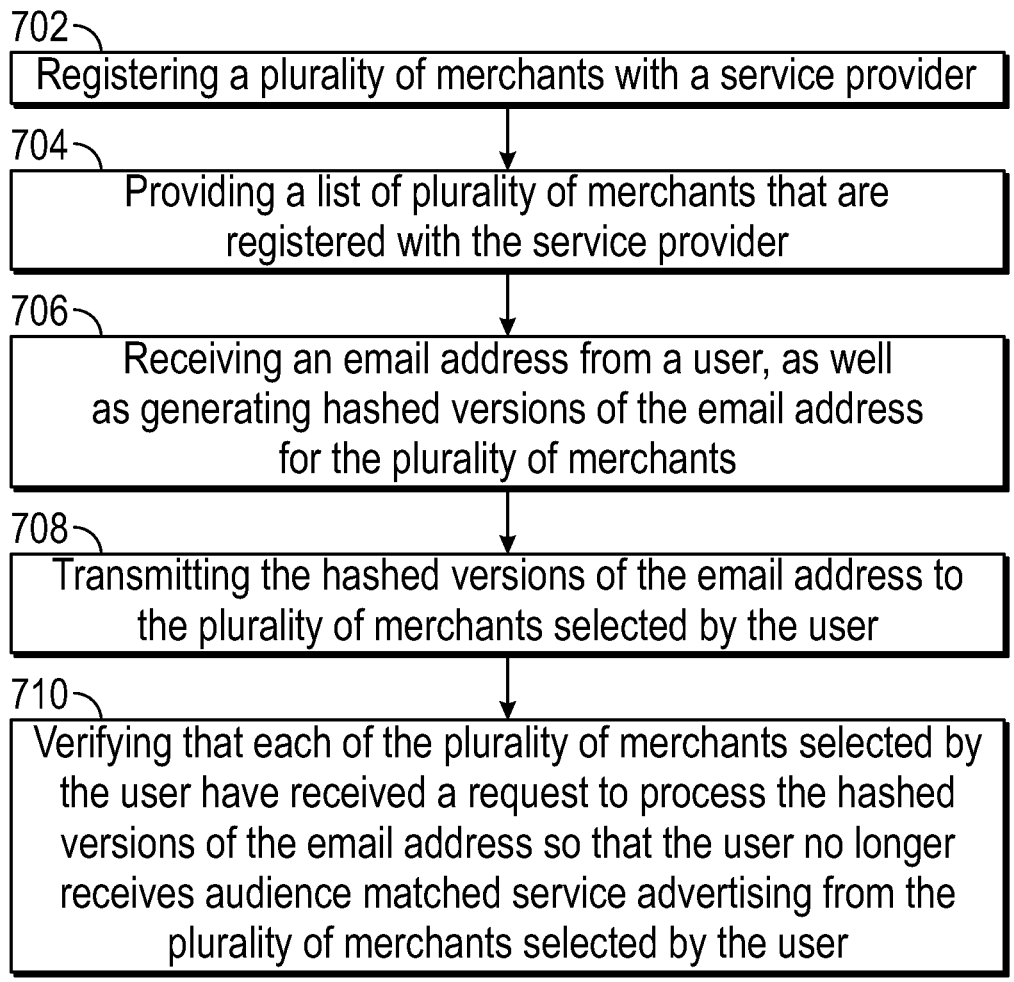
FIG. 7 is a flowchart of another example method of the present disclosure.

FIG. 7 is a flowchart of an example method. The method can comprise a step 702 of registering a plurality of merchants with a service provider. To be sure, each of the plurality of merchants has at least one endpoint. Each of the plurality of merchants can identify/specify at least a hashing algorithm that should be used for customers who wish to opt-out of TA.

In some embodiments, the method includes a step 704 of providing a list of a plurality of merchants that are registered with the service provider. It will be understood that each of the plurality of merchants and their respective endpoints provide audience matched service advertising.

The method further includes a step 706 of receiving an email address from a user, as well as generating hashed versions of the email address for the plurality of merchants. Again, each of the merchants may receive a hashed version of the email based on their preferred hashing algorithm that they identified/selected.

The method can include a step 708 of transmitting the hashed versions of the email address to the plurality of merchants selected by the user. The method also includes a step 710 of verifying that each of the plurality of merchants selected by the user have received a request to process the hashed versions of the email address so that the user no longer receives tailored advertising from the plurality of merchants selected by the user. In some embodiments, the customer can receive confirmation that a merchant has successfully processed their email address or other user contact information. The merchant may provide this confirmation back to the service provider hosting the opt-out tool. The opt-out tool may provide an email confirmation (or other similar response) back to the customer that indicate whether their email has been successfully processed and that the customer is enrolled.

FIG. 8 includes example code for implementing the TA opt-out methods disclosed herein. For example, FIG. 8 includes code for generating public keys, generating and transmitting opt-out request data gathering, generating signatures, opt-out request structure and transmission, verification of opt-out request signatures performed at the endpoint, and generation of opt-out request responses by the endpoint.

Figure 9:
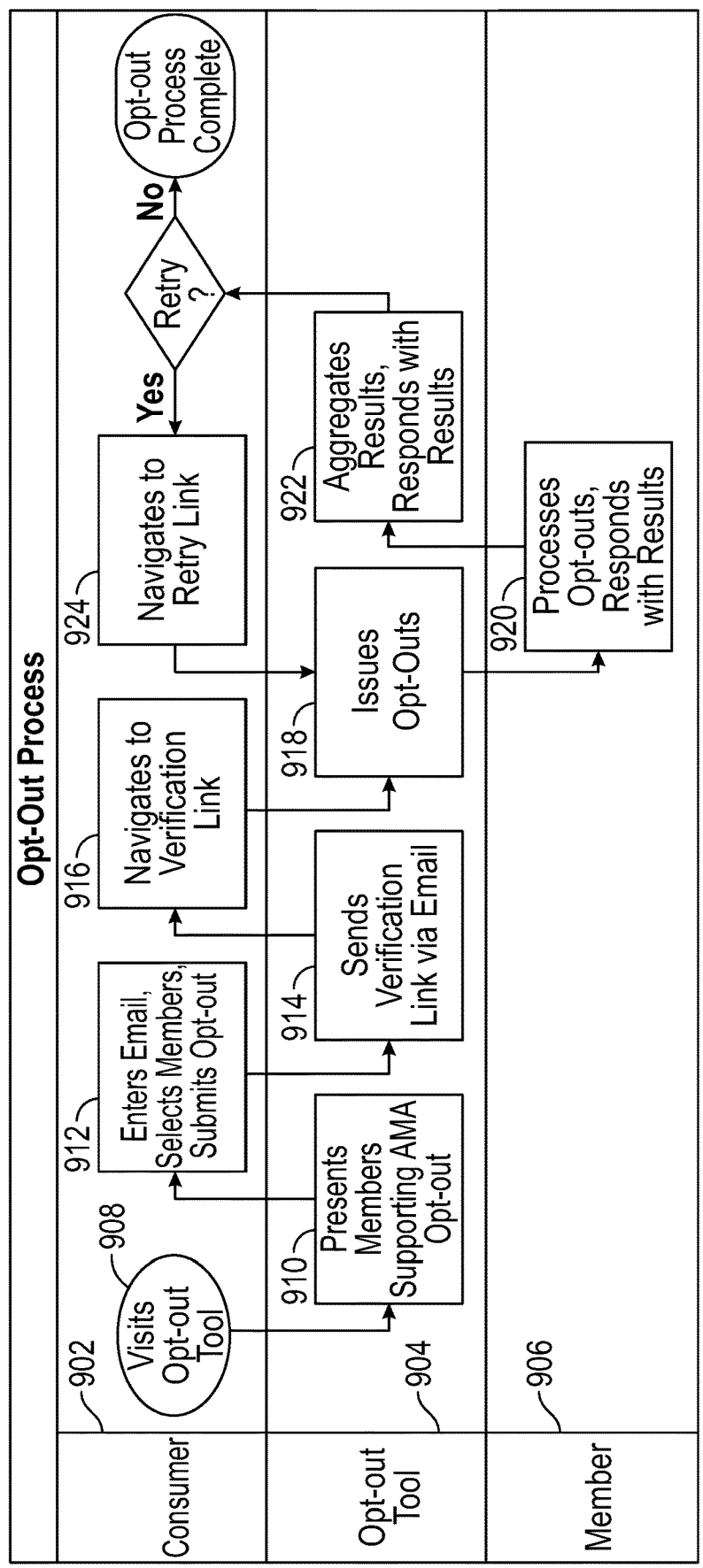
FIG. 9 is a flow diagram of a process of the present disclosure illustrating system components.

FIG. 9 is a flow diagram of an example process of the present disclosure executed by components of a system or network of systems. A customer 902, an opt-out tool 904, and a member (e.g., merchant/endpoint) 906 are illustrated. The customer 902 can visit the opt-out tool in step 908. The opt-out tool 904 can present to the customer members that participate in TA opt-outs in step 910. The customer 902 can enter their email, select members, and submit opt-out requests in step 912. The opt-out tool 904 can transmit a verification link to the email submitted by the customer in step 914. The customer 902 can navigate to the verification link in step 916. The opt-out tool 904 can issue opt-out requests to the member 906 in step 918. The member 906 then processes the opt-out requests and responds with results in step 920. The opt-out tool 904 can aggregate results and respond to the customer with results in step 922. If any endpoints fail, the customer can be asked to navigate back to a retry link in step 924 where the customer can request that the opt-out processing be reprocessed by the endpoint.

Figure 10:
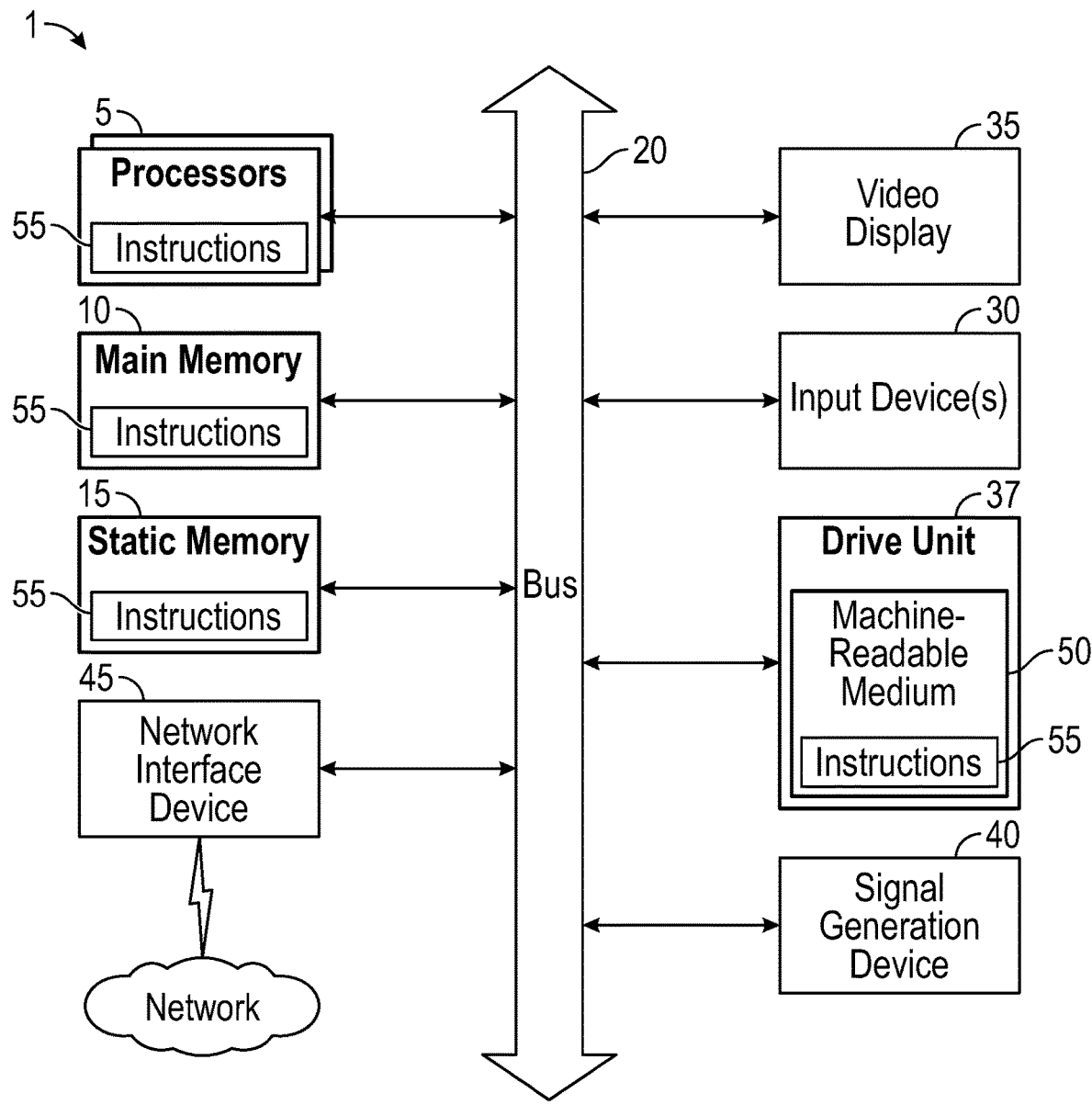
FIG. 10 is a schematic diagram of an example computer system that can be used to implement aspects of the present disclosure.

FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads from multiple users (e.g., cloud resource customers or other users). Typically, each user places workload demands upon the cloud that vary in real-time, sometimes dramatically. The nature and extent of these variations typically depend on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
   registering an endpoint with a service provider hosting an opt-out service that allows users to opt-out of tailored advertising from the endpoint, wherein registering includes receiving an endpoint address in hypertext transfer protocol (HTTP) format, generating and storing a public-private key pair specific to the endpoint, and receiving a selection of a hashing algorithm that is used to hash the user contact information;
   receiving a first request from a user comprising user contact information;
   assigning a randomly generated unique ID to the first request, wherein the randomly generated unique ID is not derived from the user contact information and is embedded in an encrypted verification link;
   serializing and encrypting opt-out preferences of the user;
   embedding the serialized and encrypted opt-out preferences in the encrypted verification link;
   generating a hashed representation of the user contact information according to the hashing algorithm selected for the endpoint;
   transmitting a second request to the endpoint, the second request comprising the hashed representation of the user contact information; and
   receiving an acknowledgment that the endpoint has processed the second request, wherein when the second request is processed the user does not receive the tailored advertising from a company which registered the endpoint, the acknowledgment is digitally signed using the endpoint's private key and includes a timestamp; and
   automatically removing a record associated with the randomly generated unique ID from servers after verification to prevent replay attacks.

2. The method according to claim 1, further comprising receiving an authorization token for the endpoint.

3. The method according to claim 1, further comprising:
   transmitting an encrypted verification message to the user; and
   verifying the user based on the user activating the encrypted verification message.

4. The method according to claim 1, further comprising:
   displaying a list of endpoints comprising the endpoint on a graphical user interface; and
   receiving a selection of the endpoint from the user via the graphical user interface.

5. The method according to claim 1, wherein registering the user with the service provider hosting opt-out service comprises receiving an acknowledgment from the endpoint that the second request has been processed.

6. The method according to claim 1, further comprising providing an indication to the user as to whether the second request has been successfully received.

* * * * *